US009656326B2

(12) United States Patent
Sadikov

(10) Patent No.: US 9,656,326 B2
(45) Date of Patent: May 23, 2017

(54) TOOL HOLDER HAVING A CLAMPING MEMBER WITH A NON-CIRCULAR CROSS-SECTION AND METHOD FOR CLAMPING A CUTTING INSERT THEREIN

(71) Applicant: Iscar, Ltd., Tefen (IL)

(72) Inventor: Meir Sadikov, Ma'alot (IL)

(73) Assignee: Iscar, Ltd., Tefen (IL)

( * ) Notice: Subject to any disclaimer, the term of this patent is extended or adjusted under 35 U.S.C. 154(b) by 833 days.

(21) Appl. No.: 13/869,767

(22) Filed: Apr. 24, 2013

(65) Prior Publication Data
US 2014/0321926 A1    Oct. 30, 2014

(51) Int. Cl.
| B23B 27/00 | (2006.01) |
| B23B 27/16 | (2006.01) |
| B23B 27/10 | (2006.01) |
| B23B 29/04 | (2006.01) |

(52) U.S. Cl.
CPC .......... *B23B 27/1666* (2013.01); *B23B 27/10* (2013.01); *B23B 29/043* (2013.01); *B23B 2205/00* (2013.01); *B23B 2260/03* (2013.01); *Y10T 29/49826* (2015.01); *Y10T 407/14* (2015.01); *Y10T 407/2282* (2015.01)

(58) Field of Classification Search
CPC ......... Y10T 407/2282; Y10T 407/2256; Y10T 407/2254; B23B 27/04; B23B 29/043; B23B 205/02
See application file for complete search history.

(56) References Cited

U.S. PATENT DOCUMENTS

| 3,455,001 A | * | 7/1969 | Sirola | B23B 27/04 407/111 |
| 3,653,107 A | * | 4/1972 | Hertel | B23B 27/04 407/112 |
| 3,846,882 A | * | 11/1974 | Stein | B23B 27/045 407/101 |
| 4,992,007 A | * | 2/1991 | Satran | B23B 27/045 407/110 |

(Continued)

FOREIGN PATENT DOCUMENTS

| WO | WO 94/09933 | 5/1994 |
| WO | WO 2013/084222 | 6/2013 |

OTHER PUBLICATIONS

International Search Report issued Aug. 26, 2014 in counterpart PCT application (PCT/IL2014/050326).

(Continued)

*Primary Examiner* — Will Fridie, Jr.
(74) *Attorney, Agent, or Firm* — Wombie Carlyle

(57) ABSTRACT

A tool holder has a main body with a holder head extending away from a holder shank, the holder head having an insert receiving pocket at a forward end thereof, with a pocket support surface. A clamping member is retained in the holder head, the clamping member comprising a clamping shaft longitudinally extending along a shaft axis. A locking member operatively engages an abutment surface of the clamping shaft. The shaft axis does not intersect the pocket support surface, and the clamping shaft has a non-circular shape in a cross-section taken perpendicular to the shaft axis. The tool holder is configured to direct a clamping force towards, and clamp a cutting insert against, the pocket support surface.

42 Claims, 5 Drawing Sheets

(56) References Cited

U.S. PATENT DOCUMENTS

| | | | |
|---|---|---|---|
| 5,360,298 A | 11/1994 | Hedlund | |
| 6,139,227 A | 10/2000 | Schafer et al. | |
| 6,814,526 B2 * | 11/2004 | Shiraiwa | B23B 27/04 407/107 |
| 8,740,511 B2 * | 6/2014 | Hecht | B23B 29/043 407/107 |
| 2014/0099168 A1 | 4/2014 | Schaefer | |

OTHER PUBLICATIONS

Written Opinion in counterpart PCT/IL2014/050326, issued Aug. 26, 2014.

\* cited by examiner

TOOL HOLDER HAVING A CLAMPING MEMBER WITH A NON-CIRCULAR CROSS-SECTION AND METHOD FOR CLAMPING A CUTTING INSERT THEREIN

FIELD OF THE INVENTION

The present invention relates to a tool holder for use in metal cutting processes in general, and for grooving, turning and parting operations in particular.

BACKGROUND OF THE INVENTION

Within the field of tool holders used in grooving, turning and parting operations there are many examples of cutting inserts being clamped in an insert receiving pocket of a tool holder having an upper pocket clamping surface and a lower pocket support surface. Some of these tool holders are configured such that a clamping force is actively applied to clamp the cutting insert between the upper pocket clamping surface and the lower pocket support surface.

U.S. Pat. No. 5,360,298 discloses such a tool holder, having a clamping member in the form of a clamping screw. The clamping screw passes through a through bore in an upper part of the tool holder associated with the upper pocket clamping surface, bisects a clamping slot extending rearwardly from the insert receiving pocket, and engages a threaded bore in a lower part of the tool holder associated with the lower pocket support surface. The clamping screw is tightened in order to clamp the cutting insert in the insert receiving pocket.

U.S. Pat. No. 6,814,526 also discloses such a tool holder, having a clamping member in the form of a drawbar and a locking member in the form of a locking screw. The drawbar comprises a head and a cylindrical shaft, the cylindrical shaft having a threaded end portion distal from the head. The cylindrical shaft bisects a clamping slot extending rearwardly from the insert receiving pocket and is threadingly retained in an upper part of the tool holder associated with the upper pocket clamping surface. The head is located in a lower part of the tool holder associated with the lower pocket support surface, and the locking screw operatively engages the head to clamp the cutting insert in the insert receiving pocket.

U.S. Pat. No. 6,139,227 also discloses such a holder, having a clamping member in the form of a transmission pin and a locking member in the form of an eccentric cam. The transmission pin is slidably retained in a first bore in a lower part of the tool holder associated with the lower pocket support surface. The first bore intersects a clamping slot located rearward of the insert receiving pocket, above which is situated an upper part of the tool holder associated with the upper pocket clamping surface. The eccentric cam is located in a second bore transverse to the first bore in the lower part of the tool holder, and operatively engages the transmission pin to clamp the cutting insert in the insert receiving pocket.

SUMMARY OF THE INVENTION

In accordance with the present invention, there is provided a tool holder comprising:
a main body having a holder head extending away from a holder shank, the holder head having an insert receiving pocket at a forward end thereof, with a pocket support surface;
a clamping member retained in the holder head, the clamping member comprising a clamping shaft longitudinally extending along a shaft axis; and
a locking member operatively engaging an abutment surface of the clamping shaft,
wherein the tool holder is configured to direct a clamping force towards, and clamp a cutting insert against, the pocket support surface,
wherein the shaft axis does not intersect the pocket support surface, and
wherein the clamping shaft has a non-circular shape in a cross-section taken perpendicular to the shaft axis.

Further in accordance with the present invention, there is provided a tool holder assembly comprising:
a main body having a holder head extending away from a holder shank in a forward direction, the holder head having an insert receiving pocket at a forward end thereof, the insert receiving pocket having a pocket support surface and an opposing pocket clamping surface;
a clamping bore formed in the main body and extending along a clamping axis, the clamping axis not intersecting the pocket support surface and the clamping bore having a non-circular shape in a cross-section taken perpendicular to the clamping axis;
a locking bore formed in the main body and intersecting the clamping bore;
a clamping member configured to be received in the clamping bore, the clamping member having a clamping shaft with an abutment surface; and
a locking member configured to be received in the locking bore and operatively engage the clamping shaft's abutment surface when the clamping member is received into the clamping bore, to thereby apply a clamping force which urges the pocket clamping surface towards the pocket support surface.

A cutting tool in accordance with the present invention may thus comprise the aforementioned tool holder assembly; and
a cutting insert clampingly retained in the insert receiving pocket between the pocket support surface and the pocket clamping surface.

Also in accordance with the present invention, there is provided a method of assembling a cutting tool comprising the aforementioned tool holder assembly and a cutting insert, the cutting insert having opposing first and second insert surfaces with an operative cutting edge associated with the first insert surface. The method comprises the steps of:
positioning the cutting insert adjacent the forward end of the holder head with a portion of the second insert surface in contact with the pocket support surface,
sliding the cutting insert in a generally rearward direction into the insert receiving pocket, and
actuating the locking member until a clamping force is applied between the second insert surface and the pocket support surface.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
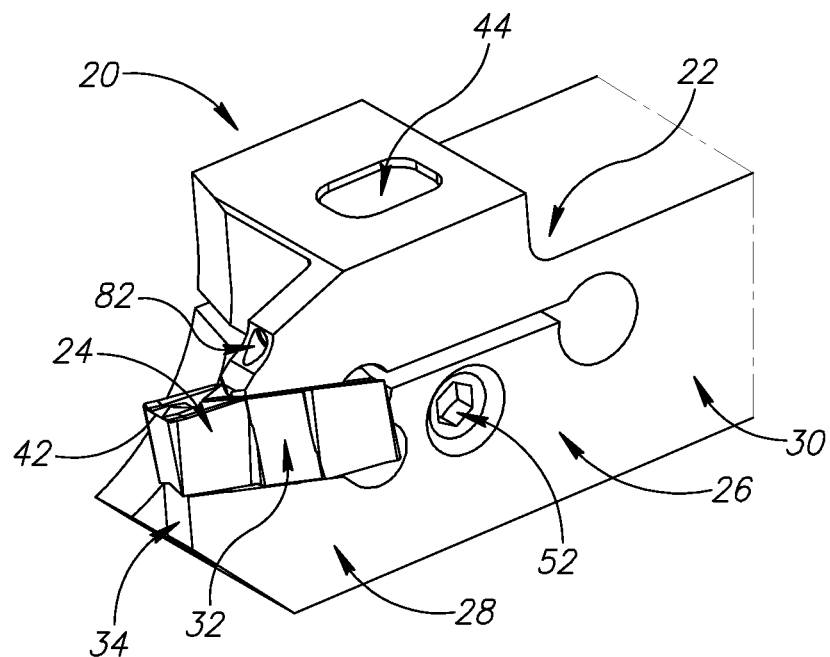
FIG. 1 is a perspective view of a cutting tool in accordance with some embodiments of the present invention.
Figure 2:
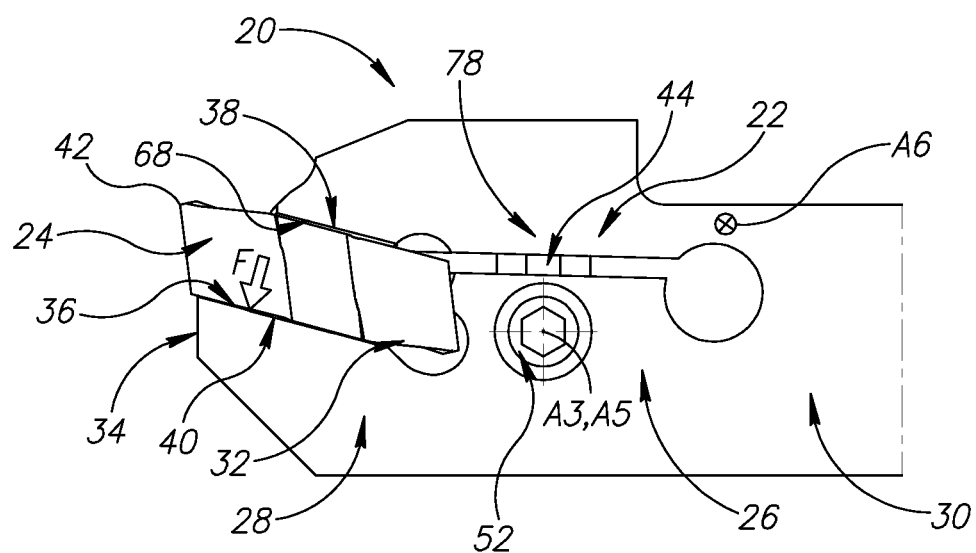
FIG. 2 is a side view of the cutting tool shown in FIG. 1.

Attention is first drawn to FIGS. 1 and 2, showing a cutting tool 20 in accordance with some embodiments of the present invention. The cutting tool 20 comprises a laterally slim tool holder 22 with a cutting insert 24 removably secured therein.

Figure 3:
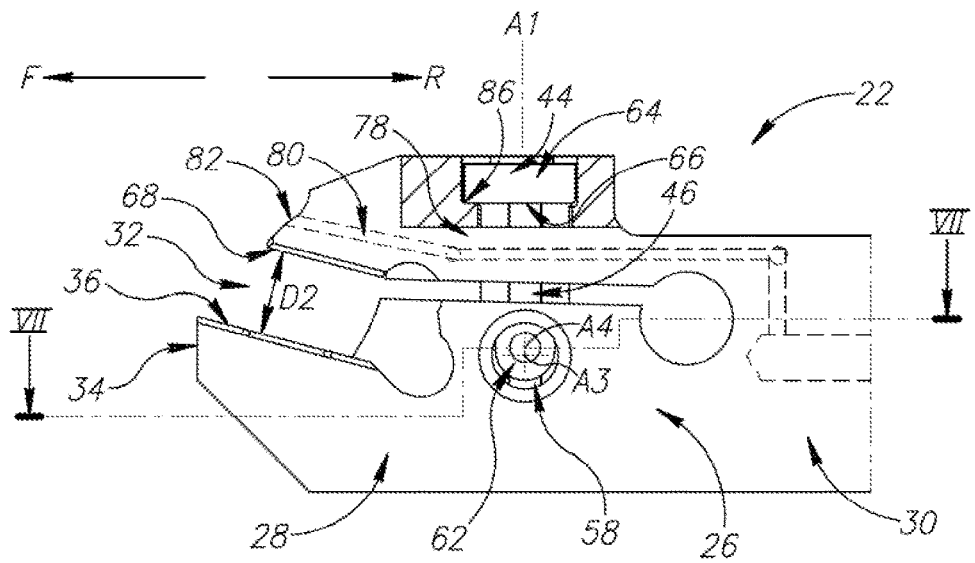
FIG. 3 is a side view of a tool holder in accordance with some embodiments of the present invention, without a locking member.
Figure 4:
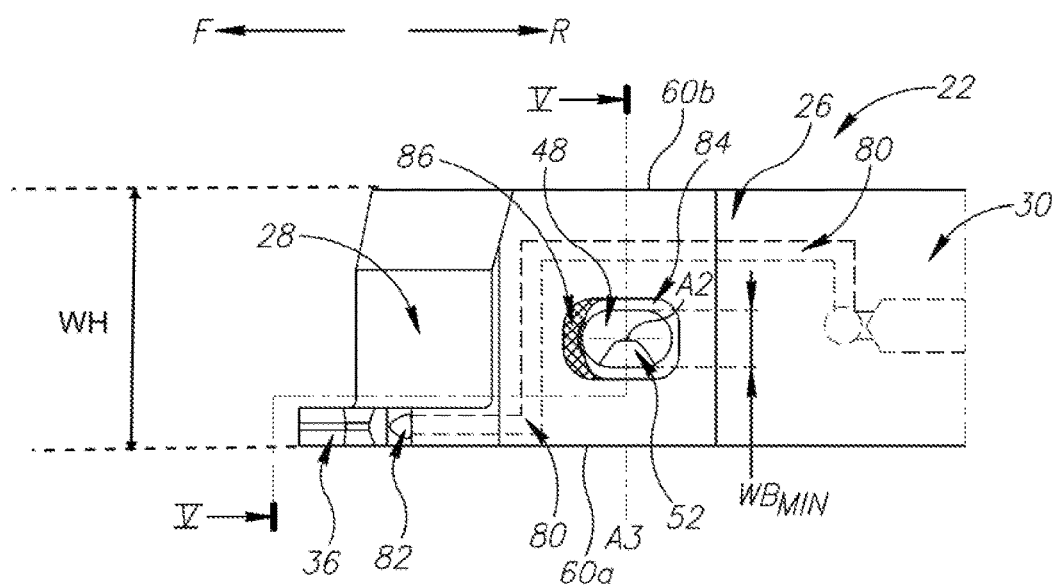
FIG. 4 is a top view of the tool holder shown in FIG. 3, without a clamping member.

As shown in FIGS. 3 and 4, the tool holder 22, which may be manufactured from hardened steel, has a main body 26 with a holder head 28 extending away from a holder shank 30 in a forward direction F, and the holder head 28 has an insert receiving pocket 32 at a forward end 34 thereof, with a pocket support surface 36.

In some embodiments of the present invention, the holder head 28 may be rigidly fixed to the holder shank 30.

Figure 5:
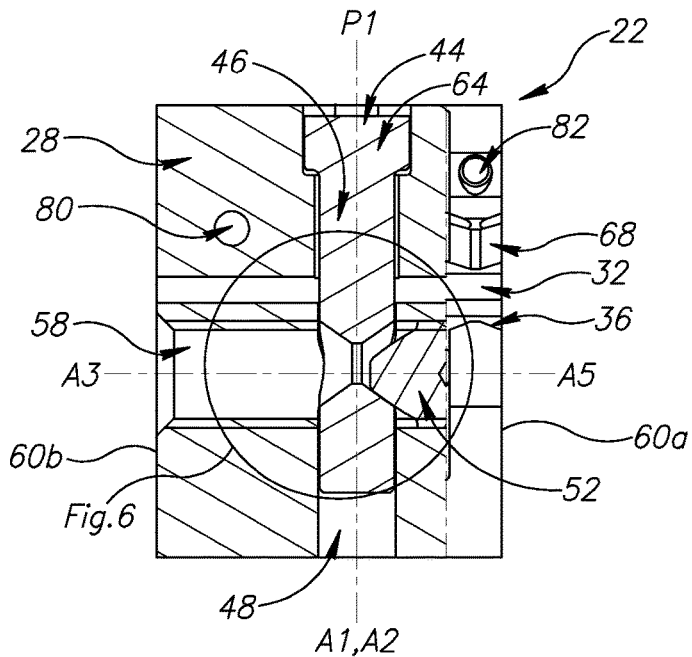
FIG. 5 is a partial cross-sectional view of the tool holder shown in FIG. 4 taken along the line V-V, with the clamping member.

Also, in some embodiments of the present invention, as shown in FIG. 5, the pocket support surface 36 may be generally V-shaped when viewed from a position forward of the insert receiving pocket 32.

According to the present invention, as shown in FIG. 2, the tool holder 22 is configured to direct a clamping force f towards, and clamp the cutting insert 24 against, the pocket support surface 36.

As shown in FIGS. 1 and 2, the cutting insert 24, which may be manufactured by form press and sintering a cemented carbide, has opposing first and second insert surfaces 38, 40, with an operative cutting edge 42 associated with the first insert surface 38, and the second insert surface 40 in clamping contact with the pocket support surface 36.

According to the present invention, as shown in FIG. 3, a clamping member 44 is retained in the holder head 28, the clamping member 44 comprising a clamping shaft 46 longitudinally extending along a shaft axis A1.

In some embodiments of the present invention, the clamping member 44 may be received in a clamping bore 48 in the holder head 28 and non-threadingly retained therein.

Also, in some embodiments of the present invention, the clamping shaft 46 may be slidably retained in the clamping bore 48.

Further, in some embodiments of the present invention, the clamping shaft 46 may be slidable solely in a direction along its shaft axis A1.

According to the present invention, as shown in FIGS. 7, 8, 11 and 12, the clamping shaft 46 has a non-circular shape in a cross-section taken perpendicular to the shaft axis A1.

Figure 7:
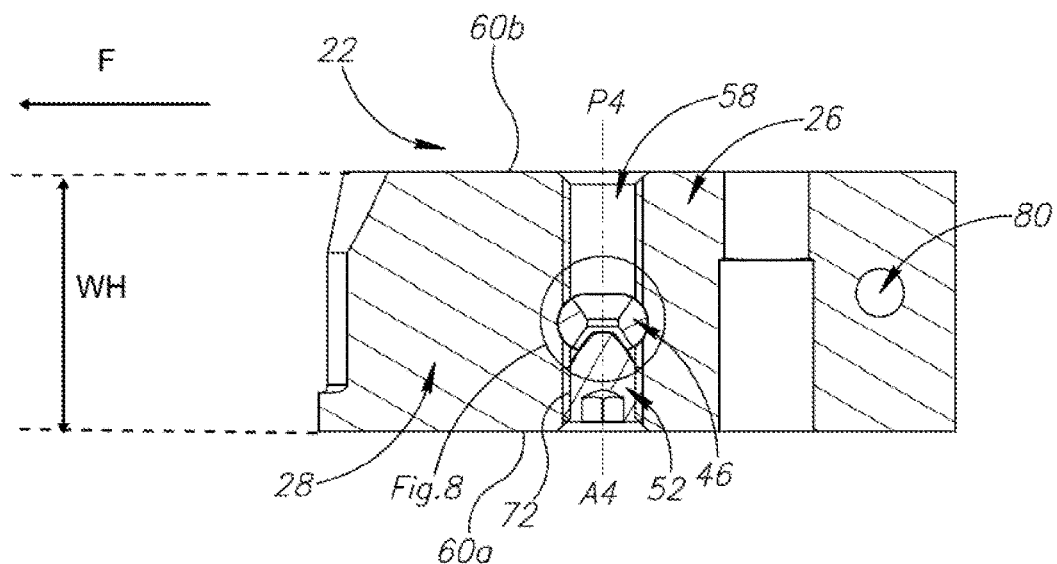
FIG. 7 is a cross-sectional view of the tool holder shown in FIG. 3 taken along the line VII-VII, with the locking member.
Figure 8:
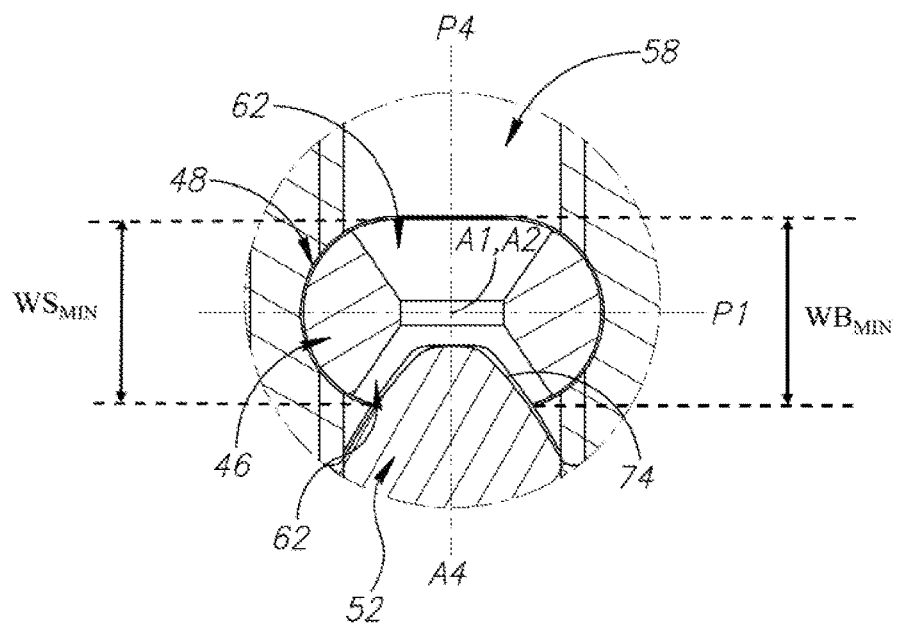
FIG. 8 is a detailed view of the tool holder shown in FIG. 7.

In some embodiments of the present invention, as shown in FIGS. 4, 7 and 8, the clamping bore 48 may extend along a clamping axis A2 and have a non-circular shape in a cross-section taken perpendicular to the clamping axis A2.

Also, in some embodiments of the present invention, as shown in FIGS. 7 and 8, the clamping axis A2 may be coaxial with the shaft axis A1, and the clamping bore 48 may have a non-circular shape corresponding to the shape of the clamping shaft 46 in a cross-section taken perpendicular to the clamping axis A2 and/or the shaft axis A1.

Further, in some embodiments of the present invention, the clamping shaft 46 may have a non-circular shape in a cross-section taken perpendicular to the shaft axis A1 along the whole of its length.

Yet further, in some embodiments of the present invention, the clamping shaft 46 may have identical profiles in two cross-sections taken perpendicular to the shaft axis A1 at opposing shaft ends 50a, 50b thereof.

Figure 6:
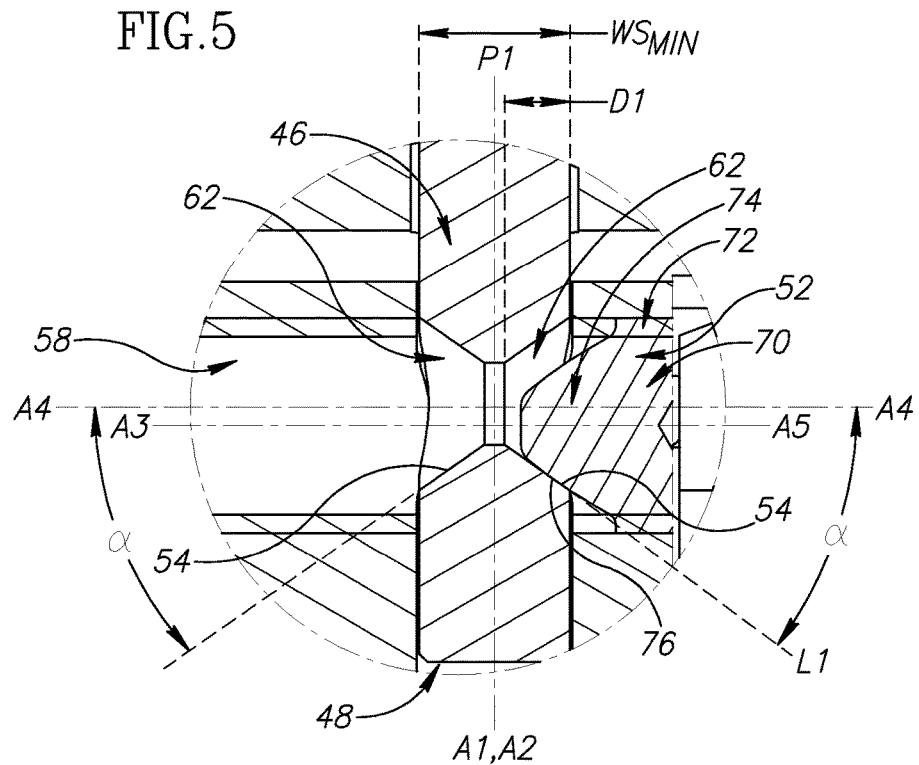
FIG. 6 is a detailed view of the tool holder shown in FIG. 5.

According to the present invention, as shown in FIGS. 5 and 6, a locking member 52 operatively engages an abutment surface 54 of the clamping shaft 46.

In some embodiments of the present invention, the locking member 52 may operatively engage a single abutment surface 54 of the clamping shaft 46.

Figure 10:
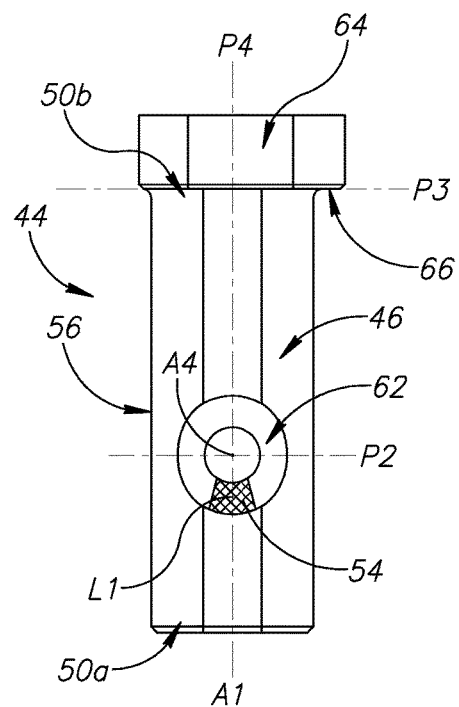
FIG. 10 is a side view of the clamping member in accordance with some embodiments of the present invention.

Also, in some embodiments of the present invention, as shown in FIG. 10, the abutment surface 54 may intersect an outer peripheral surface 56 of the clamping shaft 46.

Figure 11:
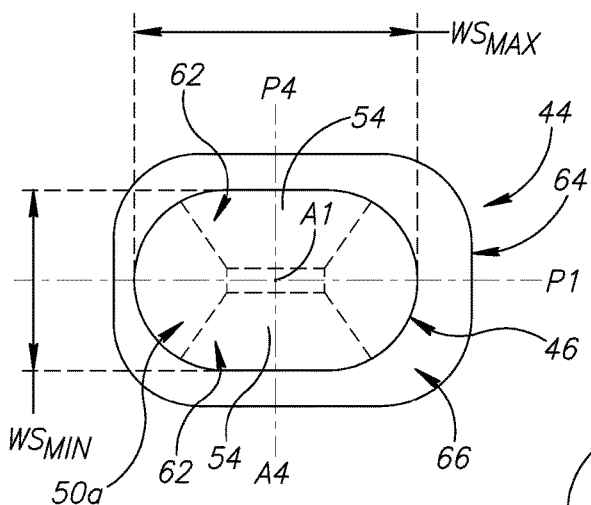
FIG. 11 is a first end view of the clamping member in accordance with some embodiments of the present invention.
Figure 12:
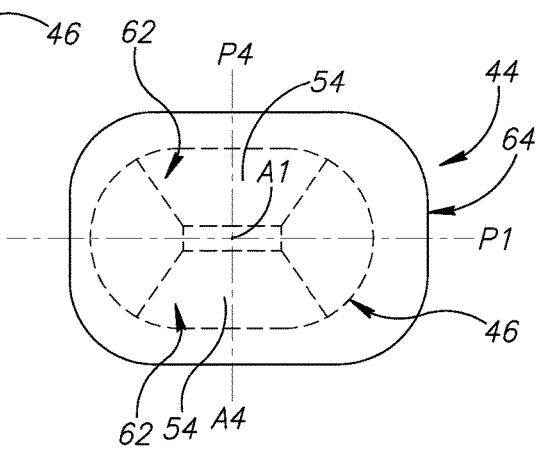
FIG. 12 is a second end view of the clamping member in accordance with some embodiments of the present invention.

Further, in some embodiments of the present invention, as shown in FIGS. 11 and 12, the abutment surface 54 may not be visible in each end-view of the clamping member 44 taken axially along the shaft axis A1.

By virtue of the clamping bore 48 having a non-circular shape corresponding to the shape of the clamping shaft 46 in a cross-section taken perpendicular to the clamping axis A2 and/or the shaft axis A1, the clamping shaft 46 may be non-rotatable about its shaft axis A1, including when the locking member 52 is not engaged to the abutment surface 54 of the clamping shaft 46, such as when the locking member 52 is removed from the tool holder 22.

The clamping shaft 46 being non-rotatable about its shaft axis A1 results in reliable operative engagement between the locking member 52 and the abutment surface 54, which beneficially contributes to the high level of clamping repeatability.

In some embodiments of the present invention, the locking member 52 may be received in a locking bore 58 in the holder head 28, and threadingly retained therein.

Also, in some embodiments of the present invention, the locking bore 58 may intersect the clamping bore 48.

As shown in FIGS. 5 and 6, the abutment surface 54 may be entirely located on one side of a shaft plane P1 containing the shaft axis A1.

In some embodiments of the present invention, the clamping shaft 46 may exhibit mirror symmetry about the shaft plane P1, such that the clamping shaft 46 has one abutment surface 54 located on each side of the shaft plane P1 and a total of two abutment surfaces 54.

Also, in some embodiments of the present invention, as shown in FIGS. 5 to 8, the locking member 52 occupied in the locking bore 58 may be entirely located on one side of the shaft plane P1.

Further, in some embodiments of the present invention, as shown in FIGS. 5 to 8, the locking bore 58 may have a locking axis A3 perpendicular to the shaft plane P1, and the locking bore 58 may intersect at least one of two opposing outer lateral surfaces 60a, 60b of the laterally slim holder head 28.

For embodiments of the present invention, where the clamping shaft 46 exhibits mirror symmetry about the shaft plane P1, the locking bore 58, although 'interrupted' by the clamping bore 48, may extend towards and open out to both of the outer lateral surfaces 60a, 60b, thus allowing the locking member 52 to operatively engage with either of the two mirror symmetrical abutment surfaces 54 and the operator to access the locking member 52 from either of the two outer lateral surfaces 60a, 60b.

In some embodiments of the present invention, as shown in FIGS. 5 and 6, the locking axis A3 may be perpendicular to the clamping axis A2 and/or the shaft axis A1.

Also, in some embodiments of the present invention, as shown in FIG. 4, the clamping bore 48 may have a minimum bore width $WB_{MIN}$ in a direction along the locking axis A3.

The 'non-circular shaped' clamping bore 48 having its minimum bore width $WB_{MIN}$ in the direction along the locking axis A3 advantageously provides sufficient space for the routing of a coolant duct 80 between the clamping bore 48 and one of the outer lateral surfaces 60b.

In some embodiments of the present invention, as shown in FIGS. 4, 7 and 8, the clamping bore 48 may be oblong shaped in a cross-section taken perpendicular to the clamping axis A2.

As shown in FIGS. 5, 6 and 8 to 10, the abutment surface 54 may form a portion of a frusto-conical shaped shaft recess 62 extending along a recess axis A4, and the recess axis A4 may be perpendicular to the shaft plane P1.

In some embodiments of the present invention, as shown in FIG. 10, the clamping member 44 may include a clamping head 64 at one shaft end 50b of the clamping shaft 46, the shaft recess 62 may have a recess plane P2 containing the recess axis A4 and perpendicular to the shaft axis A1, and the clamping head 64 and the abutment surface 54 may be located on opposite sides of the recess plane P2.

Also, in some embodiments of the present invention, as shown in FIGS. 11 and 12, the clamping shaft 46 may exhibit 180° rotational symmetry about the shaft axis A1.

Further, in some embodiments of the present invention, as shown in FIGS. 11 and 12, the clamping head 64 may not exhibit 180° rotational symmetry about the shaft axis A1.

As shown in FIG. 10, the clamping head 64 may have a head under surface 66 immediately adjacent the clamping shaft 46 facing towards the recess plane P2.

In some embodiments of the present invention, the head under surface 66 may be substantially planar and perpendicular to the shaft axis A1, and the abutment surface 54 may face towards a head plane P3 containing the head under surface 66.

As shown in FIGS. 5 and 6, the recess axis A4 may intersect the shaft axis A1 and/or the clamping axis A2, and the abutment surface 54 may form an external acute abutment angle α with the recess axis A4.

In some embodiments of the present invention, the abutment angle α may be less than 45° and greater than 20°.

As shown in FIG. 11, the clamping shaft 36 may have a maximum shaft width $WS_{MAX}$ in a direction perpendicular to the shaft axis A1 and the recess axis A4.

The 'non-circular shaped' clamping shaft 36 having its maximum shaft width $WS_{MAX}$ perpendicular to the recess axis A4 advantageously provides the clamping shaft 36 with high tensile strength in the vicinity of the shaft recess 62, as well as along the shaft's length.

In some embodiments of the present invention, as shown in FIGS. 7 and 8, the clamping shaft 46 may be oblong shaped in a cross-section taken perpendicular to the shaft axis A1.

Also, in some embodiments of the present invention, as shown in FIGS. 6 and 11, the clamping shaft 46 may have a minimum shaft width $WS_{MIN}$ in a direction along the recess axis A4 and the shaft recess 62 may have a recess depth D1 in a direction along the recess axis A4, and the recess depth D1 may be greater than a third of the minimum shaft width $WS_{MIN}$. As best seen in FIGS. 4, 7 and 8, the clamping member 44 is retained in the holder head 28 such that the minimum shaft width $WS_{MIN}$ extends principally in a width direction WH of the holder head 28 perpendicular to the forward direction F, as does the minimum bore width $WB_{MIN}$.

A method of clamping the cutting insert 24 in the tool holder 22 comprises the steps of:

positioning the cutting insert 24 adjacent the forward end 34 of the holder head 28 with a portion of the second insert surface 40 in contact with the pocket support surface 36, sliding the cutting insert 24 in a generally rearward direction R into the insert receiving pocket 32, and actuating the locking member 52 until the clamping force f is applied between the second insert surface 40 and the pocket support surface 36.

It should be understood that throughout the description and claims of the present invention, the term "actuating" describes the act of initiating movement of the locking member 52 in a predetermined direction or along a predetermined path.

It should be also understood that throughout the description and claims of the present invention, the rearward direction R is generally opposite to the forward direction F.

The recess depth D1 of the shaft recess 62 being greater than a third of the minimum shaft width $WS_{MIN}$, provides an advantageously long path length for the locking member 52 to operatively engage with the abutment surface 54, which allows selection of the optimum abutment angle α to transform the locking member 52 movement into the clamping force f applied between the second insert surface 40 and the pocket support surface 36.

According to the present invention, the shaft axis A1 does not intersect the pocket support surface 36.

In some embodiments of the present invention, the clamping axis A2 may also not intersect the pocket support surface 36.

Also, in some embodiments of the present invention, the clamping member 44 may not make contact with the cutting insert 24.

As shown in FIG. 3, the insert receiving pocket 32 may include a pocket clamping surface 68 opposing the pocket support surface 36, with the pocket clamping surface 68 and the pocket support surface 36 being spaced apart by a clamping distance D2.

In some embodiments of the present invention, the locking member 52 may operatively engage the clamping shaft's abutment surface 54 to urge the pocket clamping surface 68 towards the pocket support surface 36 and clampingly retain the cutting insert 24 in the insert receiving pocket 32 by way of the clamping force f.

Also, in some embodiments of the present invention, the locking member 52 may have a central axis A5, and the clamping distance D2 may be decreased by rotation of the locking member 52 in one direction about its central axis A5 and increased by rotation of the locking member 52 in an opposite direction about its central axis A5.

Further, in some embodiments of the present invention, as shown in FIGS. 5 and 6, the central axis A5 of the locking member 52 may be coaxial with the locking axis A3 of the locking bore 58.

Figure 9:
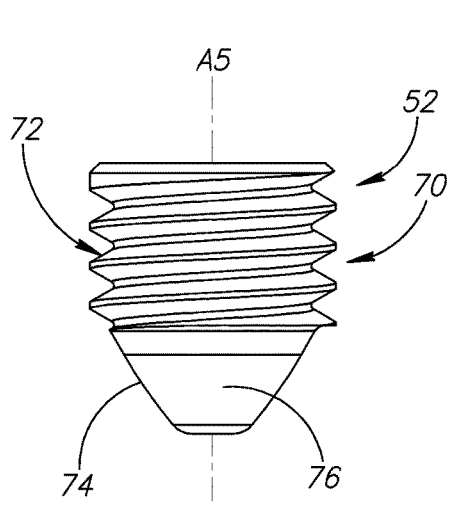
FIG. 9 is a side view of the locking member in accordance with some embodiments of the present invention.

As shown in FIG. 9, the locking member 52 may be in the form of a locking screw 70 having a threaded section 72 and a non-threaded section 74.

In some embodiments of the present invention, as shown in FIGS. 6 and 9, the non-threaded section 74 may include an abutting surface 76 having a generally frusto-conical shape, and a portion of the abutting surface 76 may contact the abutment surface 54 of the clamping shaft 46.

The abutting surface 76 having a generally frusto-conical shape, and the abutment surface 54 forming a portion of the frusto-conical shaped shaft recess 62, results in operative engagement between the abutting surface 76 and the abutment surface 54 being 'centralized' towards an imaginary line of contact L1 of the shaft recess 62, which beneficially contributes to the high level of clamping repeatability.

As shown in FIGS. 10 to 12, the imaginary line of contact L1 may be contained in a contact plane P4 perpendicular to the shaft plane P1.

In some embodiments of the present invention, the abutting surface 76 may be outwardly convex in a side view of the locking screw 70, which results in an optimally short length of contact along the imaginary line of contact L1.

As shown in FIG. 2, the pocket clamping surface 68 may be formed on an elongated clamping portion 78 of the holder head 28, and the elongated clamping portion 78 may have a resilience axis of rotation A6 rearward of the insert receiving pocket 32, with the cutting insert 24 being actively clamped between the pocket clamping surface 68 and the pocket support surface 36.

It should be understood that throughout the description and claims of the present invention, the term "actively clamped" denotes the application of the clamping force f which has to overcome the 'resilience' of the elongated clamping portion 78 and displace the elongated clamping portion 78 about its resilience axis of rotation A6 before clamping of the cutting insert 24 can occur.

In some embodiments of the present invention, as shown in FIGS. 3 and 4, the coolant duct 80 may extend through the clamping portion 78 and open out to a coolant outlet port 82 adjacent the pocket clamping surface 68, thus enabling coolant to be directed to the operative cutting edge 42 of the cutting insert 24.

Also, in some embodiments of the present invention, the clamping head 64 may be countersunk in a clamping recess 84 of the elongated clamping portion 78, such that for clamping head's 64 not exhibiting 180° rotational symmetry about the shaft axis A1, the clamping member 44 is limited to a single assembly position within the holder head 28.

The clamping member 44 being limited to a single assembly position within the holder head 28 beneficially contributes to the high level of clamping repeatability.

As shown in FIGS. 3 and 4, the head under surface 66 may engage the elongated clamping portion 68 at a single clamping zone 86 of the clamping recess 84 located entirely forward of the clamping axis A2.

The single clamping zone 86 being located on only a portion of the clamping recess 84, beneficially contributes to the high level of clamping repeatability.

The single clamping zone 86 being located entirely forward of the clamping axis A2, provides optimal transmission of the clamping force f through the elongated clamping portion 78.

In some embodiments of the present invention, as shown in FIGS. 1 and 2, the cutting insert 24 may be blade shaped, and suitable for grooving, turning and parting operations.

What is claimed is:

1. A tool holder (22) comprising:
    a main body (26) having a holder head (28) extending away from a holder shank (30), the holder head (28) having an insert receiving pocket (32) at a forward end (34) thereof, with a pocket support surface (36);
    a clamping member (44) retained in the holder head (28), the clamping member (44) comprising a clamping shaft (46) longitudinally extending along a shaft axis (A1); and
    a locking member (52) operatively engaging an abutment surface (54) of the clamping shaft (46),
    wherein the tool holder (22) is configured to direct a clamping force (f) towards, and clamp a cutting insert (24) against, the pocket support surface (36),
    wherein the shaft axis (A1) does not intersect the pocket support surface (36),
    wherein the clamping shaft (46) has a non-circular shape in a cross-section taken perpendicular to the shaft axis (A1);
    wherein the non-circular shape of the clamping shaft (46) has a minimum shaft width ($WS_{MIN}$); and
    the clamping member (44) is retained in the holder head (28) such that the minimum shaft width ($WS_{MIN}$) extends principally along a width direction (WH) of the holder head (28).

2. The tool holder (22) according to claim 1, wherein the clamping shaft (46) has a non-circular shape in a cross-section taken perpendicular to the shaft axis (A1) along the whole of its length.

3. The tool holder (22) according to claim 1, wherein the clamping shaft (46) has identical profiles in two cross-sections taken perpendicular to the shaft axis (A1) at opposing shaft ends (50a, 50b) thereof.

4. The tool holder (22) according to claim 1, wherein the clamping shaft (46) is oblong shaped in a cross-section taken perpendicular to the shaft axis (A1).

5. The tool holder (22) according to claim 1, wherein the clamping shaft (46) is non-rotatable about its shaft axis (A1), including when the locking member (52) is removed from the tool holder (22).

6. The tool holder (22) according to claim 1, wherein the clamping shaft (46) exhibits 180° rotational symmetry about the shaft axis (A1).

7. The tool holder (22) according to claim 1, wherein the locking member (52) operatively engages a single abutment surface (54) of the clamping shaft (46).

8. The tool holder (22) according to claim 1, wherein the abutment surface (54) is not visible in each end-view of the clamping member (44) taken axially along the shaft axis (A1).

9. The tool holder (22) according to claim 1, wherein the abutment surface (54) intersects an outer peripheral surface (56) of the clamping shaft (46).

10. The tool holder (22) according to claim 1, wherein the clamping member (44) does not make contact with the cutting insert (24).

11. The tool holder (22) according to claim 1, wherein the clamping member (44) is non-threadingly retained in the holder head (28) and the locking member (52) is threadingly retained in the holder head (28).

12. The tool holder (22) according to claim 1, wherein the clamping shaft (46) is slidably retained in a clamping bore (48) in the holder head (28).

13. The tool holder (22) according to claim 12, wherein the clamping shaft (46) is slidable solely in a direction along its shaft axis (A1).

14. The tool holder (22) according to claim 12, wherein the clamping bore (48) extends along a clamping axis (A2) coaxial with the shaft axis (A1), and
wherein the clamping bore (48) has a non-circular shape corresponding to the shape of the clamping shaft (46) in a cross-section taken perpendicular to the clamping axis (A2).

15. The tool holder (22) according to claim 1, wherein the abutment surface (54) is entirely located on one side of a shaft plane (P1) containing the shaft axis (A1).

16. The tool holder (22) according to claim 15, wherein the clamping shaft (46) exhibits mirror symmetry about the shaft plane (P1).

17. The tool holder (22) according to claim 15, wherein:
the locking member (52) occupies a locking bore (58) in the holder head (28), and
the locking member (52) is entirely located on one side of the shaft plane (P1).

18. The tool holder (22) according to claim 17, wherein:
the locking bore (58) has a locking axis (A3) perpendicular to the shaft plane (P1), and
the locking bore (58) intersects at least one of two opposing outer lateral surfaces (60a, 60b) of the holder head (28).

19. The tool holder (22) according to claim 15, wherein:
the abutment surface (54) forms a portion of a frusto-conical shaped shaft recess (62) extending along a recess axis (A4), and
the recess axis (A4) is perpendicular to the shaft plane (P1).

20. The tool holder (22) according to claim 19, wherein:
the clamping member (44) includes a clamping head (64) at one shaft end (50b) of the clamping shaft (46),
the shaft recess (62) has a recess plane (P2) containing the recess axis (A4) and perpendicular to the shaft axis (A1), and
the clamping head (64) and the abutment surface (54) are located on opposite sides of the recess plane (P2).

21. The tool holder (22) according to claim 20, wherein the clamping head (64) does not exhibit 180° rotational symmetry about the shaft axis (A1).

22. The tool holder (22) according to claim 20, wherein the clamping head (64) has a head under surface (66) immediately adjacent the clamping shaft (46) facing towards the recess plane (P2).

23. The tool holder (22) according to claim 22, wherein:
the head under surface (66) is substantially planar and perpendicular to the shaft axis (A1), and
the abutment surface (54) faces towards a head plane (P3) containing the head under surface (66).

24. The tool holder (22) according to claim 19, wherein:
the recess axis (A4) intersects the shaft axis (A1), and
the abutment surface (54) forms an external acute abutment angle (a) with the recess axis (A4).

25. The tool holder (22) according to claim 24, wherein the abutment angle (a) is less than 45° and greater than 20°.

26. The tool holder (22) according to claim 19, wherein the clamping shaft (46) has a maximum shaft width ($WS_{MAX}$) in a direction perpendicular to the shaft axis (A1) and the recess axis (A4).

27. The tool holder (22) according to claim 19, wherein:
the minimum shaft width ($WS_{MIN}$) extends in a direction along the recess axis (A4) and the shaft recess (62) has a recess depth (D1) in a direction along the recess axis (A4), and
the recess depth (D1) is greater than a third of the minimum shaft width ($WS_{MIN}$).

28. The tool holder (22) according to claim 1, wherein:
the insert receiving pocket (32) includes a pocket clamping surface (68) opposing the pocket support surface (36), and
the pocket clamping surface (68) and the pocket support surface (36) are spaced apart by a clamping distance (D2).

29. The tool holder (22) according to claim 28, wherein:
the pocket clamping surface (68) is formed on an elongated clamping portion (78) of the holder head (28), and
a coolant duct (80) extends through the clamping portion (78) and opens out to a coolant outlet port (82) adjacent the pocket clamping surface (68).

30. The tool holder (22) according to claim 28, wherein:
the locking member (52) has a central axis (A5), and
the clamping distance (D2) is decreased by rotation of the locking member (52) in one direction about its central axis (A5) and increased by rotation of the locking member (52) in an opposite direction about its central axis (A5).

31. The tool holder (22) according to claim 1, wherein the locking member (52) is in the form of a locking screw (70) having a threaded section (72) and a non-threaded section (74).

32. The tool holder (22) according to claim 31, wherein:
the non-threaded section (74) includes an abutting surface (76) having a generally frusto-conical shape, and
a portion of the abutting surface (76) contacts the abutment surface (54) of the clamping shaft (46).

33. A tool holder (22) assembly comprising:
a main body (26) having a holder head (28) extending away from a holder shank (30) in a forward direction (F), the holder head (28) having an insert receiving pocket (32) at a forward end (34) thereof, the insert receiving pocket (32) having a pocket support surface (36) and an opposing pocket clamping surface (68);
a clamping bore (48) formed in the main body (26) and extending along a clamping axis (A2), the clamping axis (A2) not intersecting the pocket support surface (36) and the clamping bore (48) having a non-circular shape in a cross-section taken perpendicular to the clamping axis (A2);
a locking bore (58) formed in the main body (26) and intersecting the clamping bore (48);
a clamping member (44) configured to be received in the clamping bore (48), the clamping member (44) having a clamping shaft (46) with an abutment surface (54); and
a locking member (52) configured to be received in the locking bore (58) and operatively engage the clamping shaft's abutment surface (54) when the clamping member (44) is received into the clamping bore (48), to thereby apply a clamping force (f) which urges the pocket clamping surface (68) towards the pocket support surface (36); wherein:

the non-circular shape of the clamping bore (48) has a minimum bore width (WB$_{MIN}$); and the clamping bore (48) is formed such that the minimum bore width (WB$_{MIN}$) extends principally along a width direction (WH) of the holder head (28).

34. The tool holder (22) assembly according to claim 33, wherein:

the clamping shaft (46) longitudinally extends along a shaft axis (A1) coaxial with the clamping axis (A2) when the clamping member (44) is received into the clamping bore (48), and wherein the clamping shaft (46) has a non-circular shape corresponding to the shape of the clamping bore (48) in a cross-section taken perpendicular to the shaft axis (A1).

35. The tool holder (22) assembly according to claim 33, wherein, when the clamping member (44) is received into the clamping bore (48), the clamping member (44) is non-threadingly retained therein and the locking member (52) is threadingly retained in the locking bore (58).

36. The tool holder (22) assembly according to claim 33, wherein the clamping bore (48) is oblong shaped in a cross-section taken perpendicular to the clamping axis (A2).

37. The tool holder (22) assembly according to claim 33, wherein:

the locking bore (58) has a locking axis (A3) perpendicular to the clamping axis (A2), and the locking bore (58) intersects at least one of two opposing outer lateral surfaces (60a, 60b) of the holder head (28).

38. The tool holder (22) assembly according to claim 37, wherein the minimum bore width (WB$_{MIN}$) extends in a direction along the locking axis (A3).

39. The tool holder (22) assembly according to claim 33, wherein, when the clamping member (44) is received into the clamping bore (48), the clamping shaft (46) is non-rotatable about a longitudinally extending shaft axis (A1) thereof, even when the locking member (52) is not engaged to the abutment surface (54) of the clamping shaft (46).

40. A cutting tool (20) comprising:

the tool holder (22) assembly according to claim 33; and a cutting insert (24) clampingly retained in the insert receiving pocket (32) between the pocket support surface (36) and the pocket clamping surface (68).

41. A method of assembling a cutting tool (20) which comprises the tool holder (22) assembly of claim 33 and a cutting insert (24), the cutting insert (24) having opposing first and second insert surfaces (38, 40) with an operative cutting edge (42) associated with the first insert surface (38), the method comprising the steps of:

positioning the cutting insert (24) adjacent the forward end (34) of the holder head (28) with a portion of the second insert surface (40) in contact with the pocket support surface (36), sliding the cutting insert (24) in a generally rearward direction (R) into the insert receiving pocket (32), and actuating the locking member (52) until a clamping force (f) is applied between the second insert surface (40) and the pocket support surface (36).

42. A tool holder (22) assembly comprising:

a main body (26) having a holder head (28) extending away from a holder shank (30), the holder head (28) having an insert receiving pocket (32) at a forward end (34) thereof, with a pocket support surface (36);

a clamping bore (48) formed in the main body (26) and extending along a clamping axis (A2), the clamping axis (A2) not intersecting the pocket support surface (36);

a locking bore (58) formed in the main body (26) and intersecting the clamping bore (48);

a clamping member (44) configured to be received in the clamping bore (48), the clamping member (44) having a clamping shaft (46) longitudinally extending along a shaft axis (A1); and a locking member (52) configured to be received in the locking bore (58) and operatively engage an abutment surface (54) of the clamping shaft (46) when the clamping member (44) is received into the clamping bore (48);

wherein, when the clamping member (44) is received into the clamping bore (48), the clamping shaft (46) is non-rotatable about the shaft axis (A1), even when the locking member (52) is not engaged to the abutment surface (54) of the clamping shaft (46); and wherein:

the clamping bore (48) has a minimum bore width (WB$_{MIN}$);

the clamping shaft (46) has a minimum shaft width (WS$_{MIN}$); and the minimum bore width (WB$_{MIN}$) and the minimum shaft width (WS$_{MIN}$) both extend principally along a width direction (WH) of the holder head (28).

* * * * *